Patented Oct. 14, 1952

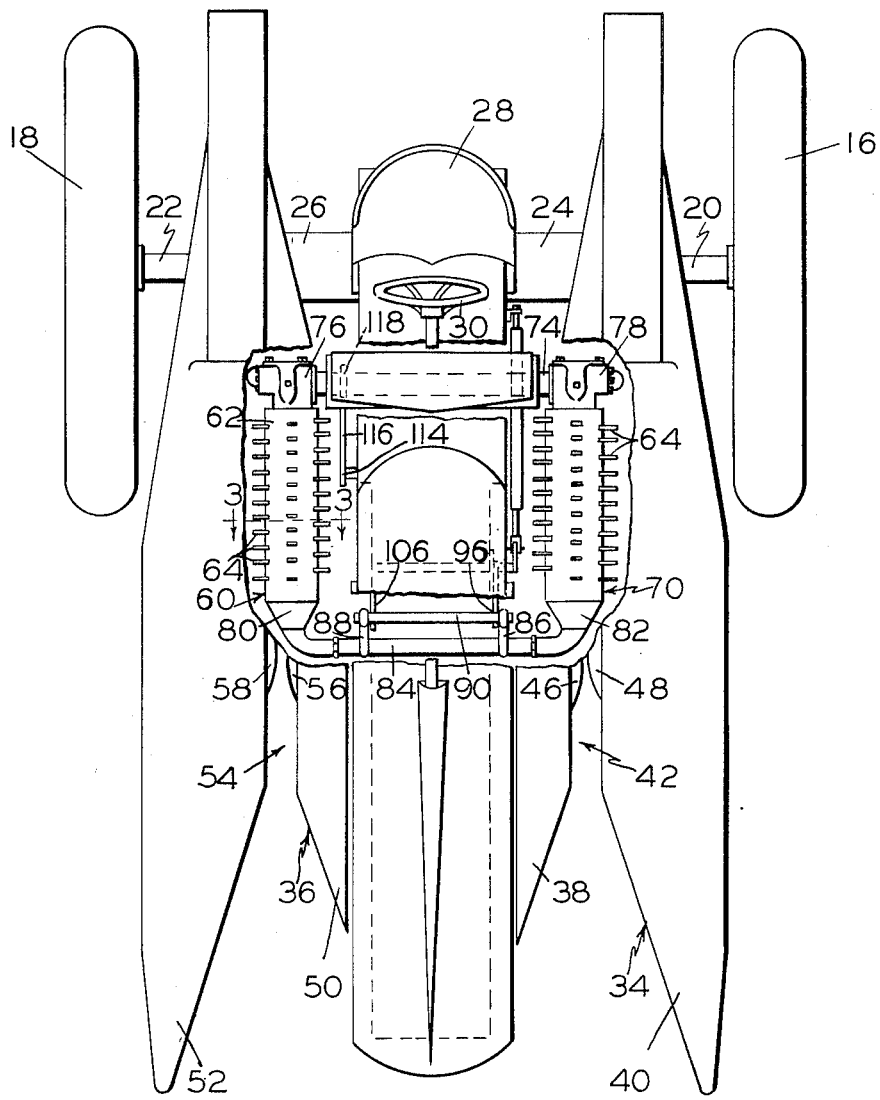

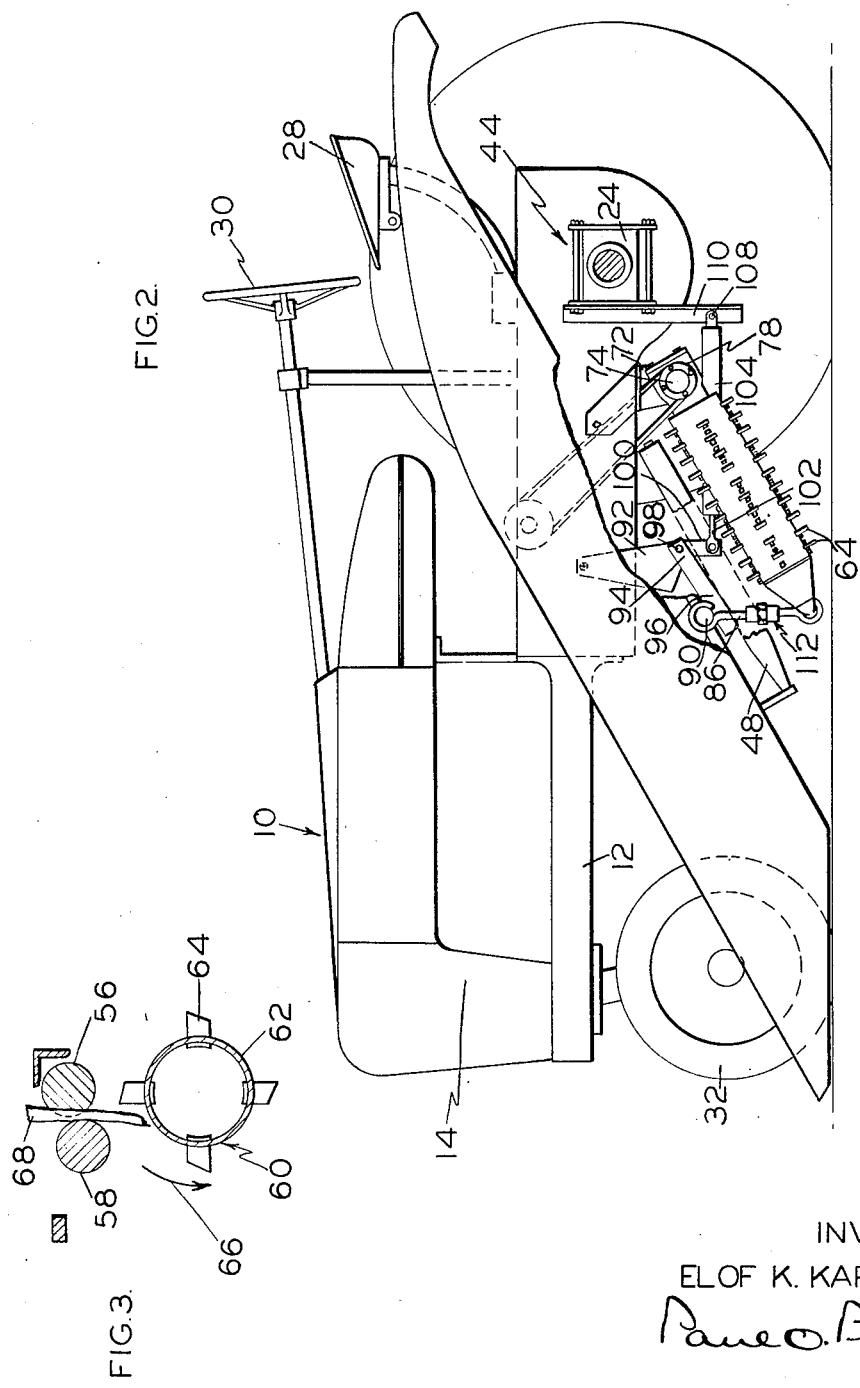

2,613,490

UNITED STATES PATENT OFFICE 2,613,490

STALK CHOPPER FOR CORN PICKERS

Elof K. Karlsson, Moline, Ill., assignor to International Harvester Company, a corporation of New Jersey Application October 15, 1949, Serial No. 121,544

1 Claim. (Cl. 55—62)

This invention relates to a new and improved stalk chopper for corn pickers.

Stalk choppers are used for two primary purposes. One of the reasons for using a stalk chopper is to kill the corn borers which nest within the stalks. These corn borer worms, if not interfered with, readily survive the winter months within the stalks and as a result are available in great numbers to attack a succeeding crop of corn in or around that same field. It is thus desirable from that standpoint to eliminate the corn borer and the only presently known effective way of controlling corn borers is to shred the stalk to such an extent that any worms lodging therein will be killed. The other reason for shredding corn stalks is to produce a more satisfactory mulch for great soil aeration. Thus a corn stalk chopper is very desirable and it is even more desirable when, as in the present case, the stalk chopper is associated with a corn picker and there is no necessity for making two trips through the field to accomplish the several desired results.

A principal object of this invention is to provide a stalk chopper for use with a field corn picker in which the chopper is located in a position to directly receive corn stalks immediately after the snapping of the ear therefrom.

An important object of this invention is to provide a field traversing corn picker of the type arranged and constructed to snap ears from standing stalks and to force the stripped stalk downwardly into a longitudinally extending stalk shredder.

Another important object of this invention is the provision of means in a tractor-mounted stalk chopper for hingedly mounting a longitudinally extending chopper with cooperative means for raising and lowering the ends of the stalk choppers opposite their hinge attachment.

Another important object of this invention is to provide a drum type stalk chopper having radially extending knife elements and the drum adapted for hinge mounting at its rearward end and capable of being raised and lowered at its forward end so that the inclination may be varied to accommodate various conditions of corn being picked.

A still further object of this invention is the provision of a corn picker having downwardly and forwardly inclined snapping rolls and forwardly and downwardly inclined stalk choppers having substantially the same inclination as the snapping rolls and located beneath and throughout substantially the full length of the snapping rolls whereupon corn stalks, after being stripped of their ears, are directly fed to the choppers for shredding to control corn borers and to better prepare the land for future use.

Another and still further important object of this invention is to supply a two-row tractor-mounted corn picker with stalk shredding means located beneath each of the picker units so that a positive control of the stalk subsequent to snapping of the ear therefrom is maintained.

Another and still further important object of this invention is to provide longitudinally disposed stalk choppers beneath corn snapping rolls and means for adjusting the angle of inclination of the stalk chopping rolls.

Other and further important objects will become apparent from disclosures in the following specification and accompanying drawings in which:

Fig. 1 is a top plan view of a corn picker with portions thereof broken away to show the stalk choppers of this invention.

Fig. 2 is a side elevational view of the device as shown in Fig. 1 with parts removed.

Fig. 3 is a sectional view taken on the line 3—3 of Fig. 1.

As shown in the drawings, the reference numeral 10 indicates generally an agricultural tractor of the type having a narrow longitudinally extending chassis 12 having an engine 14 mounted at the forward end thereof and widely spaced, large traction wheels 16 and 18 mounted at the rear thereof on axles 20 and 22 respectively which are carried within axle housings 24 and 26. An operator's seat 28 is provided between the traction wheels 16 and 18 at the rear of the tractor chassis 12. A steering wheel 30 is in close proximity to the operator and controls the steerable front wheels 32 of the tractor.

The tricycle tractor 10 as shown in the drawings is capable of carrying corn picking units on each side of the narrow longitudinally extending chassis 12 and within the confines of the widely spaced traction wheels 16 and 18. This means that a two-row corn picker may be mounted on the tractor as shown, or in the event only a single row picker is desired, the tractor will similarly accommodate just a single row picker. The present invention employs two picker units as designated by the numerals 34 and 36. The picking units are symmetrical with respect to the tractor. The unit 34 includes an inner gatherer 38 and an outer gatherer 40. These gatherers form a V-shaped guiding throat to direct stalks into a space 42 provided centrally and longitudinally between the gatherers 38 and 40. The snapping units are carried on the rear axle housings 24 and 26 as best shown in Fig. 2 at 44. The attachment 44 is a pivotal mounting permitting swinging of the forward ends of the picking units upwardly and downwardly thereabout to adjust the height at which the gatherers enter the row of standing corn. The gathering units in themselves comprise a supporting structure capable of maintaining rigidity therewithin so that the units may be pivotally swung about the mounting 44. As shown in Fig. 1, snapping rolls 46 and 48 are mounted for rotation within the supporting structure of the gathering units. The rolls 46 and 48 are inclined forwardly and downwardly as best shown in Fig. 2.

As the corn picker of this invention traverses a field of standing corn, the stalks are guided by the points 38 and 40 into the space 42, whereupon the snapping rolls 46 and 48 grip the stalks and feed them downwardly therethrough. When the ears of corn on the stocks come to the surface of the rolls 46 and 48, they are snapped therefrom and the stripped stalks continue their downward travel through the cooperative snapping rolls.

The other side of the tractor having the gathering unit 36 has an inner gatherer 50 and an outer gatherer 52 defining a V-shaped opening and a longitudinally extending confined space 54 through which the standing stalks of corn travel. Similarly, snapping rolls 56 and 58 are carried on the frame work or supporting structure of the snapping unit as described for the other side of the machine and are located within the space 54 so that standing stalks are guided to a position between these rolls in the same manner as to the rolls 46 and 48. As best shown in Fig. 3, the rolls 56 and 58 are positioned directly above a stalk chopper 60 which includes a drum member 62 and radially extending knife blade members 64. The knives 64 are preferably positioned in regularly spaced longitudinally disposed paths. The direction of rotation of the stalk chopper is indicated by the arrow 66. As a stalk 68 is forced downwardly between the rolls 56 and 58, the knife members 64 cause a shredding of the stalk before it leaves the gripping action of the snapping rolls. As shown in Fig. 1 a similar stalk chopper 70 is provided beneath the snapping rolls 46 and 48.

The stalk chopping mechanisms are mounted on a frame 72 which is carried on the underside of the longitudinally extending narrow chassis 12 of the tractor 10. The frame 72 journally carries for rotatable driving a transversely disposed shaft 74 around which each of the cylindrical chopping members 60 and 70 are swingably mounted. A gear housing 76 is mounted integrally with the end of the drum 62 of the chopping rotor 60 and is mounted on one end of the cross shaft 74. Similarly, a gear housing 78 is mounted integrally with the chopping rotor 70 and is carried on the other end of the transverse shaft 74. The forward ends of the chopping rotors 60 and 70 are provided with tapered forward ends 80 and 82 and are joined by a tie rod 84. The connections between the laterally extending ends of the tie rod 84 with the tapered points 80 and 82 have sufficient play to permit some individual separate raising and/or lowering of either of the chopping rotors. As shown in Fig. 2, the chopping rotors are substantially the length of the snapping rolls and are inclined downwardly and forwardly at an angle comparable to the angle of inclination of the snapping rolls. This facilitates the shredding of stalks and prevents any of the stalks discharged from the snapping rolls from passing directly to the ground without first passing through the scope or range of operation of the rotating knife elements 64.

Under certain conditions, it is desirable to adjustably vary the inclination of the shredding rotors and in order to accomplish this adjustment, lifting means are adapted to raise and lower the tie rod or connecting link 84. As best shown in Figs. 1 and 2, connecting links 86 and 88 join the tie rod 84 at laterally spaced points and extend upwardly therefrom to support a cross-rod 90 lying parallel to but spaced above the tie rod 84. The tractor is provided with downwardly depending fixed brackets 92 upon which are hingedly mounted bell crank levers 94 having a forwardly extending arm 96 adapted to lie beneath the cross bar 90 and upon lifting the arm 96 by reason of rotation of the bell crank 94 about a pivot 98 on the depending bracket 92 the shredding rotors are raised and lowered about their rear hinge or pivotal attachment. The bell crank 94 includes a downwardly depending arm 100 which is moved in an arcuate path about the hinge point 98 by a piston 102 movable toward and away from the arm 100 by operation of a hydraulically operable cylinder 104. Thus the chopping or shredding units 60 and 70 are raised in substantial unison upon the lifting thereof by swinging movement of the spaced arms 96 and 106.

The rearward end of the hydraulic cylinder 104 is hingedly attached at 108 on a depending bracket 110 carried by the tractor chassis 12. In addition to raising and lowering the shredding units the lifting arms 96 and 106 are adapted to raise and lower the snapping units. Thus the angle of inclination of the snapping units with respect to the shredding units remains pretty well the same. In order to separately vary the inclination of the shredding or chopping rotors turn-buckles 112 are provided intermediate the ends of the links 86 and 88 so that the links may have their length varied and thus the inclination of the rotors changed. The rotors 60 and 70 receive their driving power from a side power take-off sprocket 114 on the side of the tractor 10 and by means of a chain 116 and a drive sprocket 118 keyed or otherwise fastened to the shaft 74 imparts rotation to the shaft. Suitable gear elements, such as bevel gears (not shown), within the housings 76 and 78 cause the rotors 60 and 70 to be rotatably driven.

In operation, the corn picker of this invention travels through a field of standing corn and picks two rows of corn at a time. The stalks from adjacent rows are guided within the throats of the gathering units designated by the numerals 42 and 54 and thereafter the snapping rolls feed the stalks downwardly, stripping the ears from the stalks and throwing the stalks downwardly to direct engagement with the stalk shredders, whereupon the stalks are broken up into small pieces, killing any corn borer worms and providing a desirable mulch for the soil.

Numerous details of construction may be varied throughout a wide range without departing from the principles disclosed herein and I therefore do not propose limiting the patent granted hereon otherwise than as necessitated by the appended claim.

What is claimed is:

A corn stalk shredding attachment for a corn picker of the type having supporting structure and inclined cooperative snapping rolls for removing ears of corn from stalks and passing the stalks downwardly therebetween, comprising a shredder frame attached to the supporting structure at substantially the rear thereof, a shredder unit hingedly mounted at its rear end thereof on the shredder frame, said shredder unit including a rotatable cylindrical drum with a plurality of longitudinally spaced apart radially extending knives, said shredder unit extending forwardly and downwardly and generally longitudinally disposed beneath and substantially parallel to the inclined snapping rolls to receive all of the stalks fed downwardly by said snapping rolls, and link means joining the front end of the shredder unit with the supporting structure said link means including adjustable means for varying the inclination of the shredder unit about its rear hinge.

ELOF K. KARLSSON.

REFERENCES CITED

The following references are of record in the file of this patent:

UNITED STATES PATENTS

| Number | Name | Date |
| --- | --- | --- |
| 1,782,560 | Benjamin | Nov. 25, 1930 |
| 1,832,094 | Campbell | Nov. 17, 1931 |
| 1,894,412 | Neighbour | Jan. 17, 1933 |
| 1,945,733 | Court | Feb. 6, 1934 |
| 2,333,901 | Swenson | Nov. 9, 1943 |
| 2,484,802 | Aasland | Oct. 18, 1949 |
| 2,511,960 | Andrews | June 20, 1950 |